Dec. 21, 1954    R. D. FAULKNER    2,697,310
METHOD OF MAKING SEALS FOR COMPOSITE CATHODE-RAY TUBES
Original Filed Dec. 15, 1949
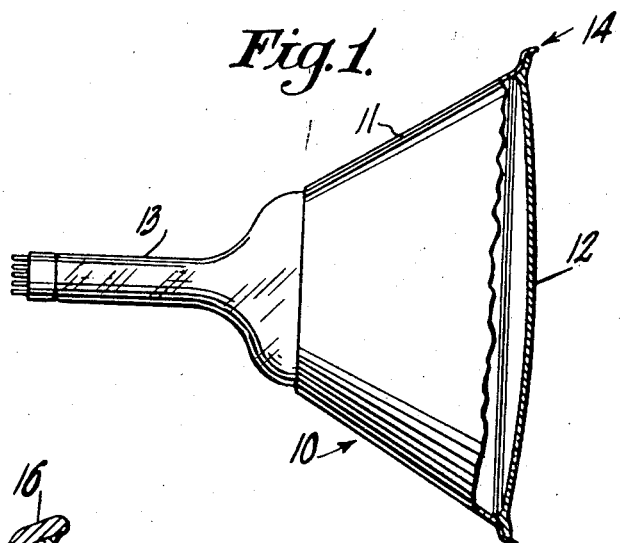
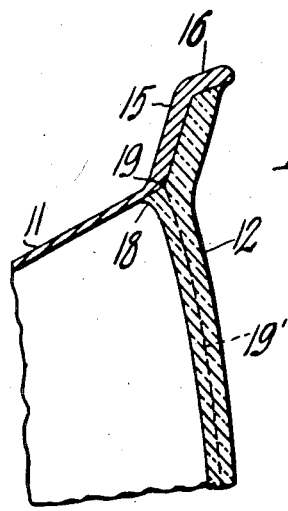
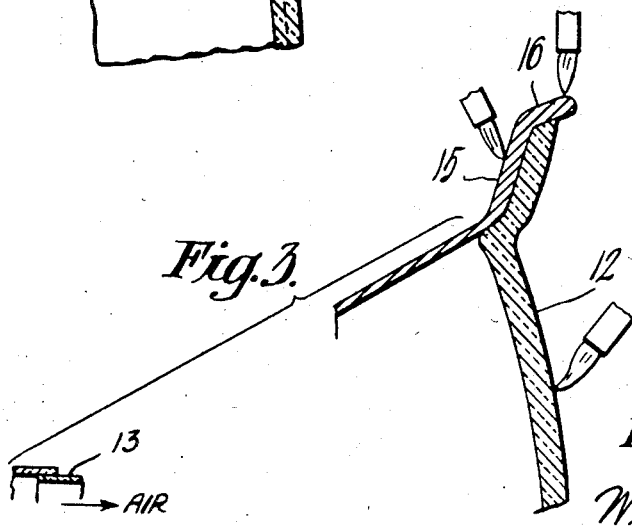
INVENTOR
Richard D. Faulkner
BY
William A. Zalesak
ATTORNEY > 2,697,310
Patented Dec. 21, 1954

2,697,310

METHOD OF MAKING SEALS FOR COMPOSITE CATHODE-RAY TUBES

Richard D. Faulkner, Lancaster, Pa., assignor to Radio Corporation of America, a corporation of Delaware Original application December 15, 1949, Serial No. 133,082. Divided and this application June 29, 1951, Serial No. 234,227

5 Claims. (Cl. 49—81)

My present invention relates to the manufacture of composite glass and metal cathode ray tubes of the type suitable for television receivers and having a relatively large face plate or screen disc sealed vacuum tight to the larger end of a metal member which is usually though not necessarily cone shaped. More specifically my invention relates to methods for making an improved seal between the face plate and the metal cone of such tubes.

This application is a division of my co-pending application Serial No. 133,082, filed December 15, 1949, having claims directed to articles which may be produced by the method(s) disclosed and claimed herein.

Ever since the advent of the first composite glass and metal cathode ray tubes considerable effort has been directed toward perfecting the sealing of the glass face plate to the metal cone, nevertheless, the percentage of such seal failures has been high and has remained a serious factor in the cost of production of such tubes. In another of my copending applications, Serial No. 120,400, filed October 8, 1949, now Patent No. 2,682,963, I disclosed an improved metal cone having a sealing land or rim which made possible substantial reductions in the cost of manufacturing such tubes since, in addition to providing a tube which could be manufactured by high speed mass production methods, it also resulted in tubes which were less subject to seal failures than those previously manufactured.

The seal between the face plate and metal cones, that is, the area adjacent the interface, in addition to being vacuum tight, must be capable of successfully withstanding tremendous stress not only when the tube has been fully processed to the state of hard vacuum therein, but also during processing and handling subsequent to the sealing of the face plate to the metal cone when equal atmospheric pressures are present on both sides of the face plate. For, as pointed out in the copending application 120,400, in order to avoid the danger of implosion after the tube is evacuated, the face plate on completion of the sealing the same to the metal cone is caused to be under sufficient inward radial compression to cause it to bow outwardly from its normal position thereby shortening its chord and radius of curvature. Thus tremendous stresses exist prior to evacuation. Subsequently, when the tube is evacuated the great external pressure to which the face plate is subjected tends to flatten out the face plate by forcing it to bow inwardly to a final position which is the desired one. Thus other tremendous stresses exist after evacuation. It is apparent that these forces must be nicely balanced successfully to attain the desired end product. Since these various forces accumulate and are effective to a maximum degree in the seal area between face plate and metal cone, the seal must be capable of withstanding first the forces brought to bear by the metal cone in the absence of a vacuum in the interior of the tube which are in a direction to cause the face plate to "pop out" on failure of the seal, and second the forces which are generated when the tube is exhausted to hard vacuum which are generally in a direction to cause the face plate to implode on failure of the seal. In view of the complex nature of the forces to which the seal is subjected both during processing of the tube and during its useful life and of the great magnitude of these forces because of the large size of the components involved such as the large expanse of face plate area subjected to the pressure of the external atmosphere, it has been customary to expect and to tolerate the occurrence of a fairly large number of seal failures during processing as a necessary though undesirable incident in the manufacture of such tubes.

I have now found from experiments which I have conducted that the primary cause for failure of the seal between the face plate and metal cone both during processing of such cathode ray tubes and during their useful life arises from the fact that while the face plate is predominantly in radial compression, a portion thereof is in tension. In the seal region, the outer or external surface of the face plate is in compression while the opposite surface which is jointed to the sealing land or flange is in tension. Failure to fully appreciate this and supply an effective solution has lead to the relatively high per cent of seal failures in the past.

It is a principal object of the present invention to provide methods of making an improved seal between the face plate and metal member of large screen composite metal and glass cathode ray tubes which has increased strength and resistance to "pop out" and implosion of the face plate.

Another object is the provision methods of making an improved seal in which the critical area thereof has such forces applied thereto as a result of the shape of the seal that the radial and axial forces to which the face plate is subjected are so balanced as to provide an improved seal which is better adapted to withstand the forces applied during processing and throughout its useful life.

A more specific feature of my invention is the provision of methods of making an improved seal between the face plate and metal member of a composite glass and metal cathode ray tube in which the metal member is provided with a rim portion having a sealing land and the seal between the face plate and metal extends not only along the sealing land but also for an effective distance along the mantle or main body portion of the metal member.

These and other objects will be apparent as the nature of my invention is more fully understood from the following description taken in conjunction with the accompanying drawing.

In carrying out my invention, I effect the seal in such manner that the glass wets and seals to not only the flange or sealing land but also a portion of the metal member adjacent the sealing land. I preferably form my seal in a manner similar to that shown and described in United States Patents Nos. 2,254,090 and 2,296,307 but permit the face plate to settle downwardly far enough to effectively wet and seal to the surface of the metal member adjacent the sealing land. I then raise or return the face plate to its desired position.

In the drawing, Figure 1 is an elevational view partly in section of a composite glass and metal cathode ray tube embodying the face plate to metal cone seal in accordance with my invention;

Figure 2 is a fragmentary sectional view thereof on an enlarged scale showing my improved seal;

Figure 3 is a view similar to Figure 2 of an intermediate step in the forming of my seal; and Figure 4 is a corresponding view of a seal made in accordance with the practice heretofore followed.

Referring now to the drawing in detail, a composite glass and metal cathode ray tube 10 has an envelope which comprises a metal mantle 11 in the shape of a truncated cone to the large end of which is sealed a glass face plate 12 while a glass neck 13 is sealed to the other or small end of the mantle. The usual electron gun structure (not shown) is mounted in neck 13 while a fluorescent screen (not shown) is provided on the interior surface of face plate 12.

The mantle or metal cone 11 is provided with a flange 14 having a large diameter sealing land 15 which is preferably cone-shaped and lip 16 to which the peripheral portion of face plate 12 is sealed in accordance with well known practices as shown in Figure 4 wherein is shown the seal which has heretofore been in use in order that my present invention may be more readily clearly understood. The structure shown in Figure 4 may be readily made in accordance with United States Patents Nos. 2,254,090 and 2,296,307. As pointed out hereinabove and in my said copending application such a structure as that illustrated in Figure 4 has proven to have objectionable shortcomings.

I have found that by sealing the glass of face plate 12 to peripheral portion 17 of metal cone 11 in addition to land 15 and lip 16, as most clearly shown in Figure 2, an improved seal as well as face plate-metal cone assembly results which is far superior to that heretofore in use. A fillet 18 integral with and forming a smooth continuation of face plate 12 is provided in such manner that the forces to which the metal cone, seal and face plate are subjected are properly distributed as will be more fully pointed out hereinbelow. In the final seal, the center line or plane 19—19' of face plate 12 remains undistorted even in the region immediately adjacent the shoulder formed between portion 17 and sealing land 15. Additional benefits are derived when the face plate is so positioned that plane 19—19' intercepts the shoulder formed between portion 17 and sealing land 15.

In the manufacture of a 16-inch cathode ray tube, a suitable alloy for the metal cone is one containing essentially about 28 percent chromium and about 72 per cent iron while the face plate may be any ordinary lime silica window glass. Another and less costly alloy is a 17 per cent chrom-iron alloy as disclosed in the patent application of A. Rose, Serial No. 87,405, filed April 14, 1949. The metal cone is positioned for the sealing operation with flange 14 presented upwardly and face plate 12 is centered on the cone-shaped sealing land. The assembly is subjected to preheating fires while caused to rotate about its axis. When the glass is above 250 degrees C. the sealing operation is started. The face plate seal to the sealing land is preferably made by heating the under side of land 15 to a temperature of about 1000 to 1200 degrees C. preferably close to 1200 degrees C. The glass is allowed to flow out to lip 16 covering the sealing land. Simultaneously the face plate beyond the immediate sealing area is maintained at a temperature ranging between 530 degrees C. and 630 degrees C. and preferably close to 550 degrees C., that is, a temperature just above annealing temperature of the glass so that all stresses are removed from the face plate during the sealing operation. During the formation of the seal the face plate is allowed to settle downwardly as shown in Figure 3 until portion 17 of the metal cone has been wet by the glass. The face plate is then forced back to the desired position of Figure 2 by increasing the air pressure under the face plate. As shown schematically in Figure 3 the small end of neck 13, which is open at this stage of the processing of tube 10, is connected to a source of air under pressure.

Though the precise dimensions may be varied slightly, I have found that the most satisfactory results are attained when the face plate is sealed to the top ⅛ inch of portion 17 of the metal cone adjacent the starting point of the radius of the shoulder between metal cone 11 and sealing land 15. Fillet 18 must blend into the radius of curvature of the face plate and for best results is accomplished within ⅜ inch of the metal.

On completion of the sealing operation the assembly is allowed to reach equilibrium at a temperature of about 525 degrees C. to 575 degrees C., preferably close to 550 degrees C. At the later temperature stress relief and temperature equilibrium is completed in the exceedingly short time of five minutes and the assembly may then be left to cool down in air at room temperature. This short annealing period is made possible by the fact that during sealing operation strains in the face plate were continuously relieved and the glass is maintained in radial compression during the cooling process.

In view of the differential shrinking which takes place while the assembly is cooled down from about 550 degrees C. to room temperature, the face plate comes under high compression. The shape of my seal insures that the forces applied to the face plate have their main component directed along the center line or portion 19—19' of the face plate, the spherical symmetry of which having been preserved. I have further found that of the various parts of the metal cone 11 in the seal region the shoulder of the metal cone exerts by far the predominant force on the face plate. It is apparent from Figure 4 that in constructions heretofore made this was neither appreciated or properly taken advantage of. On the other hand, it is apparent in Figure 2 that by the avoidance of reentrant angles in the seal region and by blending the curvature of the glass into that of the metal I have provided a seal between large glass and metal components which is inherently strong and able to withstand the forces to which it is subjected. Furthermore, by preserving the spherical curvature of the center plane of the face plate in the region adjacent the seal and forming the relatively large area fillet between the face plate and metallic member, what tension as does exist on the underside of the seal is distributed over the relatively large area of the fillet. When the face plate is positioned so that the center plane intersects sealing land 15 where it merges with metallic cone 11 that is within approximately ⅛ inch of the mid-plane of the shoulder the bending forces which would otherwise be generated by flange 14 and face plate 12 are substantially eliminated and the metallic member now exerts on the face plate predominantly pure compressive forces. Here again, residual tension on the underside of the seal is distributed over the relatively large area of the fillet.

It is, therefore, apparent that cathode ray tubes constructed in accordance with my invention have enhanced resistance to shock while the face plate-mantle assembly is not subject to seal failure and popping-out of the face plate. Though specific materials have been described as well as the preferred method of making my seal, it is apparent that changes may be made without departing from the scope of my invention as set forth in the appended claims. For example other alloys and glasses may be used and variations in the temperature at which the various steps are carried out may be made, however, I have found that my preferred temperatures provide the most satisfactory construction.

What is claimed is:

1. The method of sealing a glass face plate to the end of a metal envelope having a flange extending outwardly from the end of the envelope, comprising arranging said metal envelope with its flange in a substantially horizontal plane, placing the glass face plate in contact with the flange, heating to sealing temperature said flange and the contacting edge of the plate until the plate can be moved against the flange and the hot glass has contacted a portion of the envelope adjacent said flange, and then finally forcing substantially all of the face plate not in contact with the flange and envelope back toward its original position.

2. The method of sealing a glass face plate to a tubular metallic member having a flange extending outwardly from the end thereof for a cathode ray tube, comprising arranging said metallic member with its flange in a substantially horizontal plane, laying the face plate on the flange, heating to sealing temperature said flange and an adjacent portion of said metallic member and a peripheral portion of said face plate, allowing said face plate to settle by gravity toward said flange and until the glass has contacted a portion of the metallic member adjacent said flange, moving the portion of the face plate not contacting the metal back toward its original position, and continuing the heating until the face plate is in such position that the glass portion between the surfaces of the plate intersects the shoulder formed between said flange and said metallic member.

3. The method of sealing a glass face plate to a tubular metallic member having a flange extending outwardly from the end thereof for a cathode ray tube, comprising arranging said metal envelope with its flange in a substantially horizontal plane, laying the face plate on the flange, heating to sealing temperature said flange and a portion of said metallic member adjacent to said flange and a peripheral portion of said face plate, allowing said face plate to settle by gravity toward said flange and until the hot glass has contacted said portion of the metallic member adjacent to said flange, moving the portion of the face plate not contacting the metal back toward its original position, and continuing the heating and movement of the face plate until the face plate is in such position that its glass portion between the surfaces thereof intersects the shoulder formed between said flange and said metallic member and forms a fillet between the face plate and said adjacent metallic member portion.

4. The method of sealing a glass plate to a metal structure comprising a flange having a sealing-land and a tubular mantle portion jointed to the inner periphery of said land to form a shoulder therewith including the steps of: supporting the structure with the sealing land facing upwards; laying the plate thereupon with the underside of its periphery resting on said land; heating the sealing land and said periphery of the face plate to sealing temperature to wet the former with softened glass of the latter; heating a larger portion of the periphery of the plate than its portion which rests on the sealing land until the center portion of the plate settles down a short distance into the flange and wets said shoulder portion; and introducing air under pressure beneath the plate to raise the central portion thereof toward substantially its original position.

5. The method of sealing a convex face plate for a composite metal-and-glass cathode ray television tube to a metal cone comprising a flange having a sealing land facing in a first direction and a mantle portion extending from the inner periphery of said land in the opposite direction, the area of the face plate being very large with respect to its thickness and to the area of said land, including the steps of: supporting the cone with the sealing land facing upwards; laying the face plate on the cone with its convex side facing upwards and the underside of its periphery resting on said land; heating the sealing land and said periphery of the face plate to sealing temperature to wet the former with softened glass of the latter; heating a larger portion of the periphery of the plate than its portion which rests on the sealing land until the plate settles down a short distance into the cone and wets the juncture thereof to said land; and introducing air into the cone under sufficient pressure to raise the central portion of the plate and which is bounded by said land to restore to substantially its original convex shape.

References Cited in the file of this patent

UNITED STATES PATENTS

| Number | Name | Date |
|---|---|---|
| 2,296,307 | Power | Sept. 22, 1942 |
| 2,318,653 | Wiener | May 11, 1943 |
| 2,518,690 | Holman et al. | Aug. 15, 1950 |

FOREIGN PATENTS

| Number | Country | Date |
|---|---|---|
| 583,242 | Great Britain | Dec. 12, 1946 |